US012684252B2

(12) United States Patent
Ishioka et al.

(10) Patent No.: US 12,684,252 B2
(45) Date of Patent: Jul. 14, 2026

(54) IMAGING APPARATUS, METHOD FOR CONTROLLING IMAGING APPARATUS, AND STORAGE MEDIUM

(71) Applicant: CANON KABUSHIKI KAISHA, Tokyo (JP)

(72) Inventors: Toshiya Ishioka, Kanagawa (JP); Aihiko Numata, Tokyo (JP); Suguru Hosono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 18/438,851

(22) Filed: Feb. 12, 2024

(65) Prior Publication Data

US 2024/0284055 A1 Aug. 22, 2024

(30) Foreign Application Priority Data

Feb. 22, 2023 (JP) ................................. 2023-026283

(51) Int. Cl.
*H04N 23/80* (2023.01)

(52) U.S. Cl.
CPC ................................... *H04N 23/80* (2023.01)

(58) Field of Classification Search
CPC ........ H04N 23/80; H04N 23/81; H04N 25/68; H04N 25/134; H04N 25/78; H04N 25/773
See application file for complete search history.

(56) References Cited

U.S. PATENT DOCUMENTS

| 2014/0307130 A1* | 10/2014 | Furuta | H04N 25/134 |
| | | | 348/246 |
| 2015/0146200 A1* | 5/2015 | Honda | G01J 1/0474 |
| | | | 356/237.5 |
| 2020/0244909 A1* | 7/2020 | Morimoto | H10F 30/225 |
| 2021/0368119 A1* | 11/2021 | Hirose | H04N 25/78 |
| 2024/0276122 A1* | 8/2024 | Kobayashi | H04N 25/773 |

OTHER PUBLICATIONS

Ivan Rech et al., "Optical Crosstalk in Single Photon Avalanche Diode Arrays: a New Complete Model;" Jun. 9, 2008 / vol. 16, No. 12 / Optics Express 8381; pp. 1-14.

* cited by examiner

*Primary Examiner* — Hung H Lam
(74) *Attorney, Agent, or Firm* — Canon U.S.A., Inc. IP Division

(57) ABSTRACT

An apparatus includes at least one processor executing instructions that, when executed by the at least one processor, cause the at least one processor to store first information indicating a first pixel of a sensor to be a target of predetermined correction processing and second information indicating a second pixel of the sensor to be a target of the predetermined correction processing in a case where a predetermined condition is satisfied, set the second pixel to a target of the predetermined correction processing in a case where an estimation value based on an output of the second pixel specified by the second information satisfies the predetermined condition, and correct, in an image acquired by the sensor, through the predetermined correction processing, a value of the first pixel and a value of the second pixel set to be a target of the predetermined correction processing.

12 Claims, 15 Drawing Sheets

| No. | Defect ID | X position | Y position | Value |
|-----|-----------|------------|------------|-------|
| 1 | 1 | *** | *** | — |
| 2 | 1 | *** | *** | — |
| 15 | 0 | *** | *** | *** |
| 16 | 1 | *** | *** | — |

FIG.5A

| No. | Defect ID | X position | Y position | Grade |
|-----|-----------|-----------|-----------|-------|
| 1 | 1 | *** | *** | *** |
| 2 | 1 | *** | *** | *** |
| 15 | 2 | *** | *** | A |
| 16 | 2 | *** | *** | B |
| 17 | 2 | *** | *** | A |

FIG.5B

| Grade | Value |
|-------|-------|
| A | *** |
| B | *** |
| E | *** |

FIG.8A

| No. | Defect ID | X position | Y position | Grade |
|-----|-----------|------------|------------|-------|
| 1 | 1 | *** | *** | *** |
| 2 | 1 | *** | *** | *** |
| 15 | 2 | *** | *** | A |
| 16 | 2 | *** | *** | B |
| 17 | 2 | *** | *** | A |
| 18 | 3 | *** | *** | D |

FIG.8B

| Grade | Value |
|-------|-------|
| A | a |
| B | b |
| E | e |

FIG.8C

| Defect ID | Rate |
|-----------|------|
| 2 | AA |
| 3 | BB |
| 7 | FF |

IMAGING APPARATUS, METHOD FOR CONTROLLING IMAGING APPARATUS, AND STORAGE MEDIUM

BACKGROUND

Technical Field

The aspect of the embodiments relates to an imaging apparatus, a method for controlling the same, and a storage medium.

Description of the Related Art

Recently proposed image sensors use avalanche photo-diodes (hereinafter, referred to as "APDs") in light-sensitive elements, digitally count the number of photons incident on the APDs, photoelectrically convert the count values into digital signals, and output the digital signals for each pixel. I. Reach et al., OpEx 16(12), 2008 discusses an issue that crosstalk occurs in an image sensor that includes APDs. Crosstalk in an image sensor that includes APDs results from secondary electrons being discharged from an APD due to an avalanche phenomenon caused by photons incident on the APD and then entering another APD in the image sensor. An entrance of secondary electrons resulting from an avalanche phenomenon in an APD of a pixel to another APD of another pixel causes an erroneous count, such as an increase in the pixel value count.

In an image sensor, a defective pixel having a characteristic of outputting a signal even in a state without incident light may occur, and such a defective pixel may also occur in an image sensor that includes APDs. Several correction processes for defective pixels are known, such as a process of inferring, from analogy, a correct output value for a defective pixel based on output values of its adjacent pixels and setting the approximated output value to an output of the defective pixel.

SUMMARY

According to an aspect of the embodiments, an apparatus includes a sensor including a plurality of pixels, at least one processor, and a memory coupled to the at least one processor, the memory storing instructions that, when executed by the at least one processor, cause the at least one processor to store first information indicating a first pixel to be a target of predetermined correction processing and second information indicating a second pixel to be a target of the predetermined correction processing in a case where a predetermined condition is satisfied, the first pixel and the second pixel being included in the plurality of pixels of the sensor, set the second pixel to a target of the predetermined correction processing in a case where an estimation value based on an output of the second pixel specified by the second information satisfies the predetermined condition, and correct, through the predetermined correction processing, a value of the first pixel in an image acquired by the sensor and a value of the second pixel set to be a target of the predetermined correction processing in the image acquired by the sensor.

Further features of the disclosure will become apparent from the following description of exemplary embodiments with reference to the attached drawings.

BRIEF DESCRIPTION OF THE DRAWINGS

FIG. 1 is a diagram illustrating an example of a functional configuration of an imaging apparatus.

FIG. 3 is a diagram illustrating an example of correction processing-related information according to a first exemplary embodiment.

FIGS. 5A and 5B are diagrams illustrating an example of correction processing-related information according to a second exemplary embodiment.

FIGS. 8A to 8C are diagrams illustrating an example of correction processing-related information according to a third exemplary embodiment.

DESCRIPTION OF THE EMBODIMENTS

Figure 2:
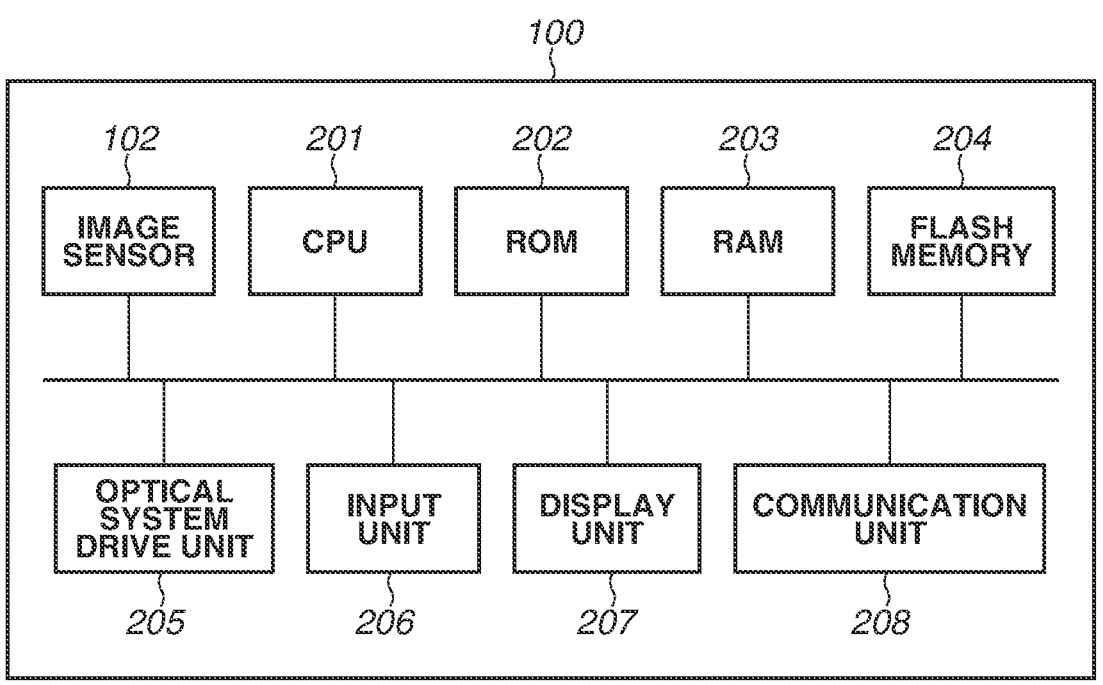
FIG. 2 is a diagram illustrating an example of a hardware configuration of the imaging apparatus.

Various exemplary embodiments of the disclosure will be described below with reference to the accompanying drawings. The below-described exemplary embodiments are not intended to limit the disclosure, and not all combinations of features according to the below-described exemplary embodiments are always essential to the technical solution provided by the disclosure. Configurations according to the exemplary embodiments can be modified or changed as needed based on a specification of an apparatus to which the disclosure is applied and various conditions (e.g., condition of use, environment of use).

Components or processing steps that correspond or are similar to each other according to the exemplary embodiments are given the same reference numeral, and redundant descriptions thereof are omitted.

Figure 1:
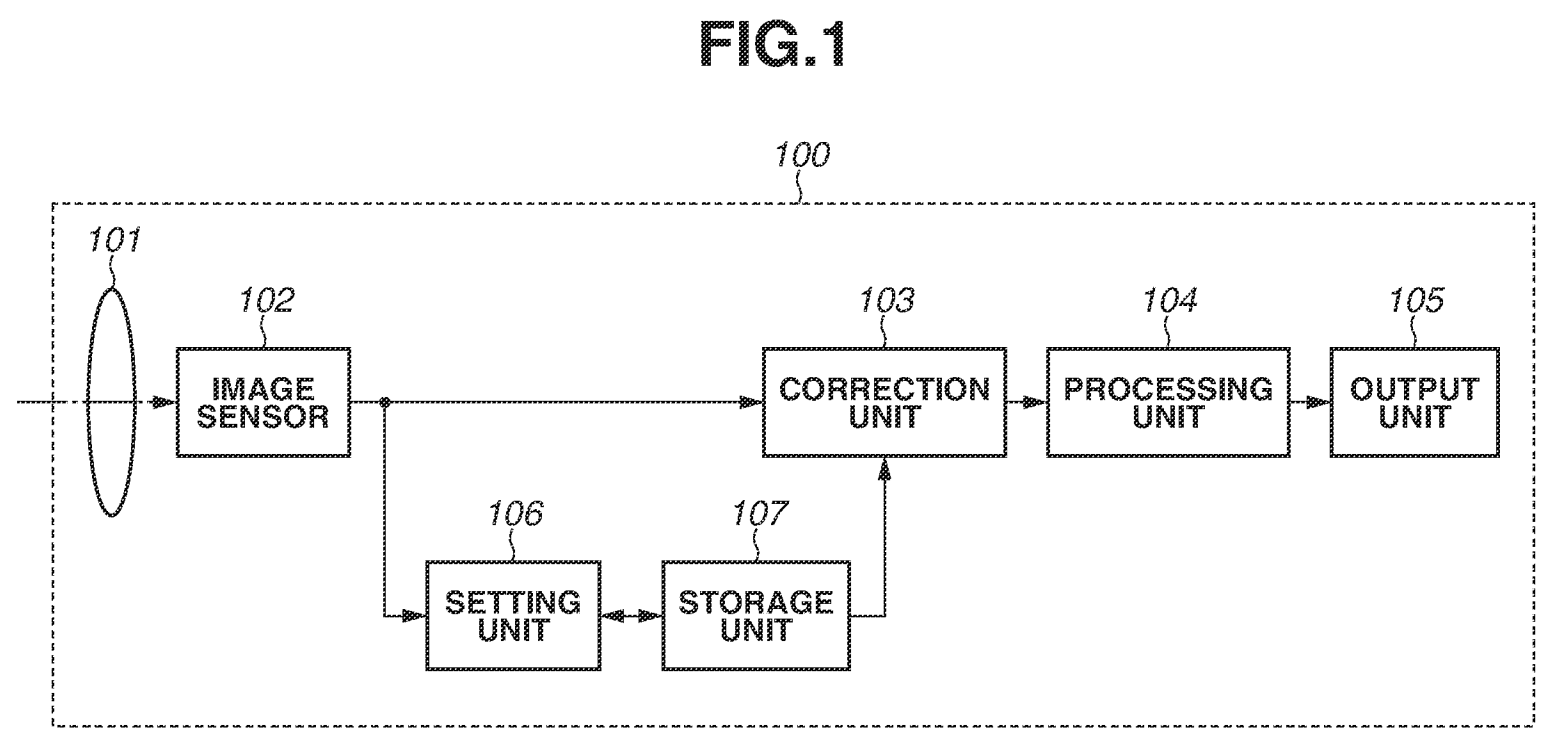

A first exemplary embodiment of the disclosure will be described below. FIG. 1 is a diagram illustrating a schematic configuration of main components of an imaging apparatus 100 according to the first exemplary embodiment.

In the imaging apparatus 100 according to the present exemplary embodiment, a lens 101 captures light from the outside and forms an optical image of a subject on an image sensor 102. The image sensor 102 converts light incident thereon via the lens 101 into electronic data for each pixel. The image sensor 102 according to the present exemplary embodiment uses avalanche photodiodes (APDs) as light-sensitive elements of the pixels.

Electronic data that the image sensor 102 outputs is monochrome two-dimensional image data, and electronic data on the two-dimensional image for each pixel is generated by photoelectrically converting count values of the number of incident photons counted digitally.

A storage unit 107 stores, as correction processing-related information, first information indicating a first pixel of the image sensor 102 and second information indicating a second pixel of the image sensor 102. The first pixel has a predetermined characteristic, and the second pixel has a characteristic with a possibility of becoming the first pixel. According to the present exemplary embodiment, the first pixel is a defective pixel with an output value in a state without incident light (hereinafter, referred to as "no-incident-light state") greater than or equal to a first threshold set in advance, which is the predetermined characteristic. The first pixel is a pixel to be a target of predetermined correction processing, more specifically, defect correction, which is described below.

The second pixel is a pixel to be a target of the predetermined correction processing in a case where the second pixel satisfies a predetermined condition described below. Hereinafter, the first threshold is a threshold for defective pixel determination and will be referred to as "defective pixel determination threshold". According to the present exemplary embodiment, the second pixel is a pixel with a possibility of becoming a defective pixel as a time of use of the image sensor 102 increases, and hereinafter, the second pixel will be referred to as "candidate defect pixel". The candidate defect pixel is a pixel that outputs in the no-incident-light state an output value that is currently less than a threshold for a defective pixel determination and is greater than or equal to a second threshold set in advance. The second threshold is a threshold for a candidate defect pixel determination and is lower than the defective pixel determination threshold. Hereinafter, the second threshold will be referred to as "candidate defect pixel determination threshold" according to the present exemplary embodiment. Specifically, according to the present exemplary embodiment, a candidate defect pixel is a pixel with an output value that is currently less than the defective pixel determination threshold but may become greater than or equal to the defective pixel determination threshold as a time of use increases.

The correction processing-related information stored in the storage unit 107 includes at least information about type of defects in the pixels of the image sensor 102, position of each pixel in a two-dimensional image captured by the image sensor 102, and about output value of the pixels in the no-incident-light state. Details thereof will be described below. According to the present exemplary embodiment, output values of the pixels in the no-incident-light state that are stored in the storage unit 107 are not output values of defective pixels in the no-incident-light state but output values of candidate defect pixels in the no-incident-light state that may become a defective pixel as a time of use of the image sensor 102 increases. The correction processing-related information will be described in detail below with reference to specific examples.

A setting unit 106 determines, for each pixel of a two-dimensional image output from the image sensor 102, whether to treat the pixel as a defective pixel or as a candidate defect pixel that may become a defective pixel, based on the correction processing-related information stored in the storage unit 107. The setting unit 106 updates the correction processing-related information stored in the storage unit 107 based on the determination results. Details of the pixel determination process by the setting unit 106 and the process of updating the information in the storage unit 107 will be described below. The setting unit 106 outputs, from the storage unit 107 to a correction unit 103, information about the position of each pixel (defective pixel) to be treated as a defective pixel among the pixels of the two-dimensional image output from the image sensor 102.

The correction unit 103 performs correction processing on the two-dimensional image data output from the image sensor 102 based on the defective pixel position information read from the storage unit 107. For example, the correction unit 103 identifies a pixel (i.e., defective pixel) to be a target of the correction processing from among the pixels of the two-dimensional image based on the defective pixel position information and performs correction processing on the identified defective pixels. The correction processing on the defective pixels may be any processing, such as processing of inferring, from analogy, a correct output value of a defective pixel based on output values of adjacent pixels and using the inferred output value as an output of the defective pixel as described above.

A processing unit 104 generates image data from data having been subjected to the defective pixel correction processing by the correction unit 103. According to the present exemplary embodiment, two-dimensional image data that the image sensor 102 outputs is monochrome data, whereas image data that the processing unit 104 outputs is color two-dimensional image data. The processing unit 104 also performs various image processing, such as gain adjustment, white balance adjustment, gamma adjustment, and demosaicing, during a process of generating color two-dimensional image data from monochrome two-dimensional image data.

An output unit 105 outputs color two-dimensional image data having been subjected to the image processing by the processing unit 104 to the outside.

While the processing order in which the correction processing by the correction unit 103 is performed on the output of the image sensor 102 according to the present exemplary embodiment is described as an example, the correction processing on defective pixels may be performed during the image processing by the processing unit 104 or after the processing performed by the processing unit 104.

FIG. 2 is a diagram illustrating an example of a hardware configuration of the imaging apparatus 100 according to the present exemplary embodiment. The imaging apparatus 100 includes the image sensor 102, a central processing unit (CPU) 201, a read-only memory (ROM) 202, a random access memory (RAM) 203, a flash memory 204, an optical system drive unit 205, an input unit 206, a display unit 207, and a communication unit 208. FIG. 2 illustrates main components among various components of the imaging apparatus 100, and the imaging apparatus 100 further includes other hardware components (not illustrated) that an ordinary imaging apparatus would include.

The CPU 201 executes various programs stored in the ROM 202 including programs according to the present exemplary embodiment to realize various computation processing and functions of the setting unit 106, the correction unit 103, the processing unit 104, and the storage unit 107 according to the present exemplary embodiment. The imaging apparatus 100 includes one or more of dedicated hardware components different from the CPU 201, and at least part of the processing of the CPU 201 may be performed by the dedicated hardware component(s). Examples of dedicated hardware include an application-specific integrated circuit (ASIC), a field-programmable gate array (FPGA), and a digital signal processor (DSP). The ROM 202 includes a storage area for storing a boot program, the programs according to the present exemplary embodiment, and parameters to be set for the components of the imaging apparatus 100. The RAM 203 is used as a temporary storage area, such as a main memory of the CPU 201 and a work area. The flash memory 204 stores two-dimensional image data.

The optical system drive unit 205 drives a focus lens and a diaphragm of the lens 101 under the control of the CPU 201. The input unit 206 converts user inputs via various buttons (not illustrated), keys (not illustrated), and a touch panel (not illustrated) of the imaging apparatus 100 into signals processible in the imaging apparatus 100 and inputs the signals to the CPU 201. The display unit 207 includes, for example, a liquid crystal display and a light emitting diode (LED) and displays a graphical user interface (GUI) for a user to operate the imaging apparatus 100. Thus, the CPU 201 also generates GUI images to display on the display unit 207. The communication unit 208 performs communication processing between the imaging apparatus 100 and external apparatuses. The communication by the communication unit 208 can be performed via a wired network such as a local area network (LAN) or via a wireless network.

The correction processing-related information stored in the storage unit 107, the pixel determination process to be performed by the setting unit 106, and the process of updating the information in the storage unit 107 in the imaging apparatus 100 according to the present exemplary embodiment will be described in detail below.

According to the present exemplary embodiment, the correction unit 103 performs, for example, correction processing by inferring, from analogy, a correct output value of a defective pixel based on output values of pixels adjacent to the defective pixel and set the approximated output value to an output of the defective pixel, as described above.

However, as described above, output values may change as a time of use of the image sensor 102 including APDs increases. Changes in output values include a change in dark count rate (DCR) and a change in dark current. DCR is a count value per unit time in a case where the output value (count value) increases due to electrons thermally excited in the no-incident-light state. The defective pixel correction processing described above is not adaptable to such a change in output value with increased time of use. Specifically, for example, there is a pixel that is currently not a defective pixel, and even in a case where an output value of the pixel changes as a time of use increases and the pixel becomes a pixel to be treated as a defective pixel, the correction processing is not applicable to the pixel.

Thus, the imaging apparatus 100 according to the present exemplary embodiment treats, as a candidate defect pixel, a pixel of the image sensor 102 that is currently not a defective pixel but may become a pixel to be treated as a defective pixel as a time of use increases, among the pixels of the image sensor 102. The imaging apparatus 100 according to the present exemplary embodiment estimates a change in an output value of a candidate defect pixel in the no-incident-light state with increased time of use, and in a case where the estimation value satisfies a predetermined condition that the estimation value is greater than or equal to the defective pixel determination threshold, the candidate defect pixel is treated as a defective pixel.

Further, according to the present exemplary embodiment, the correction processing-related information stored in the storage unit 107 includes information about type of defect in the respective pixels of the image sensor 102, position of the respective pixels in the two-dimensional image, and about output value of respective candidate defect pixels in the no-incident-light state. Hereinafter, an output value of a pixel in the no-incident-light state will be referred to as "dark output value".

According to the present exemplary embodiment, the information about the defect type indicates identification information (ID) representing a type indicating whether a pixel is a defective pixel or a candidate defect pixel. The information about the position of the pixel in the two-dimensional image is information about a position in X-axis and Y-axis directions in the two-dimensional image that correspond to the arrangement of the pixels of the image sensor 102. The position information for the pixels in the two-dimensional image is used in identifying a position of a defective pixel that is a correction processing target and a position of a candidate defect pixel to be treated as a defective pixel in a case where the above-described predetermined condition is satisfied.

FIG. 3 is a diagram illustrating an example of correction processing-related information stored in the storage unit 107. As illustrated in FIG. 3, the storage unit 107 stores "No." (pixel number) information indicating the pixels, followed by information represented by "Defect ID", "X Position", "Y Position", and "Value" in this order from the left. The "Defect ID" information is identification information (ID) with which a defect type indicating whether a pixel indicated by a pixel number is a defective pixel or a candidate defect pixel described above is identifiable based on a numerical value thereof.

According to the present exemplary embodiment, the "Defect ID" that is "1" indicates a defective pixel, whereas the "Defect ID" that is "0" indicates a candidate defect pixel. The "X Position" information indicates a coordinate position in the X-axis direction in the two-dimensional image, and the "Y Position" information indicates a coordinate position in the Y-axis direction in the two-dimensional image. The "Value" information indicates an output value (dark output value) of a candidate defect pixel in the no-incident-light state, in other words, output value information. Specifically, according to the present exemplary embodiment, the first information indicating the first pixel having the predetermined characteristic corresponds to the "Defect ID" information that is "1", the "X Position" information, and the "Y Position" information. Further, according to the present exemplary embodiment, the second information indicating the second pixel having a characteristic with a possibility of becoming the first pixel corresponds to the "Defect ID" information that is "0", the "X Position" information, the "Y Position" information, and the "Value" information. In FIG. 3, the symbol "***" in a field indicates the presence of some information in the field.

The correction processing-related information illustrated as examples in FIG. 3 is generated, for example, during manufacturing of the imaging apparatus 100 or based on user instructions, and in both cases, the information is made updatable. For example, in the case of generating the correction processing-related information during manufacturing of the imaging apparatus 100, a two-dimensional image is acquired in the no-incident-light state in which the image sensor 102 is not exposed. Then, whether an output value is greater than or equal to the defective pixel determination threshold or is currently less than the threshold but may become greater than or equal to the defective pixel determination threshold as a time of use increases is determined for each pixel of the two-dimensional image. The "Defect ID" of a pixel with an output value that is currently greater than or equal to the defective pixel determination threshold is set to "1". The "Defect ID" of a pixel with an output value that is currently less than the defective pixel determination threshold but may become greater than or equal to the threshold as a time of use increases is set to "0", and dark output value information in the no-incident-light state is described in the "Value" information. Thus, the information as illustrated in FIG. 3 is generated.

In the case of generating the correction processing-related information based on user instructions, the no-incident-light state where the image sensor 102 is not exposed is created by, for example, completely closing the diaphragm of the optical system or prompting the user to attach a lens cap. Then, for example, processing similar to the processing during manufacturing of the imaging apparatus 100 is performed in operating a calibration function of the imaging apparatus 100, so that correction processing-related information as illustrated in FIG. 3 is obtained. The information generated during manufacturing of the imaging apparatus 100 or based on user instructions is set as initial values, and the information is updatable as described below.

In the present exemplary embodiment, the threshold for use in determining whether a pixel is a defective pixel is preset based on the characteristics of the image sensor 102. The candidate defect pixel determination threshold for use in determining whether a pixel that is currently not a defective pixel may become a defective pixel as a time of use increases is set lower than the defective pixel determination threshold as described above. The candidate defect pixel determination threshold is calculatable by, for example, calculating a prediction value of a change in output value due to a time of use or the number of times an avalanche phenomenon occurs based on the characteristics of the image sensor 102 and performing back calculation based on the prediction value of the change and the service life of the imaging apparatus 100. Specifically, for example, an initial value of an output value that is determined to have a possibility of becoming greater than the defective pixel determination threshold within the service life of the imaging apparatus 100 is useable as the candidate defect pixel determination threshold.

In the present exemplary embodiment, an accumulation value of output values of a candidate defect pixel is used in estimating a change in output value with increased time of use. Specifically, in the image sensor 102 using APDs, the number of times an avalanche phenomenon occurs affects a change in pixel output value, and a result of counting the number of times an avalanche phenomenon occurs is obtained as an output value of each pixel in the image sensor 102 using APDs. Thus, a current dark output value of a candidate defect pixel can be estimated based on an initial value of an output value of the candidate defect pixel, a result of accumulation of output values of the candidate defect pixel, and a rate of change in output value with respect to the number of times an avalanche phenomenon occurs that is determined based on the characteristics of the image sensor 102. Thus, whether to treat a candidate defect pixel as a defective pixel can be determined based on whether an estimation value of a current dark output value of the candidate defect pixel is greater than or equal to the defective pixel determination threshold.

Figure 4:
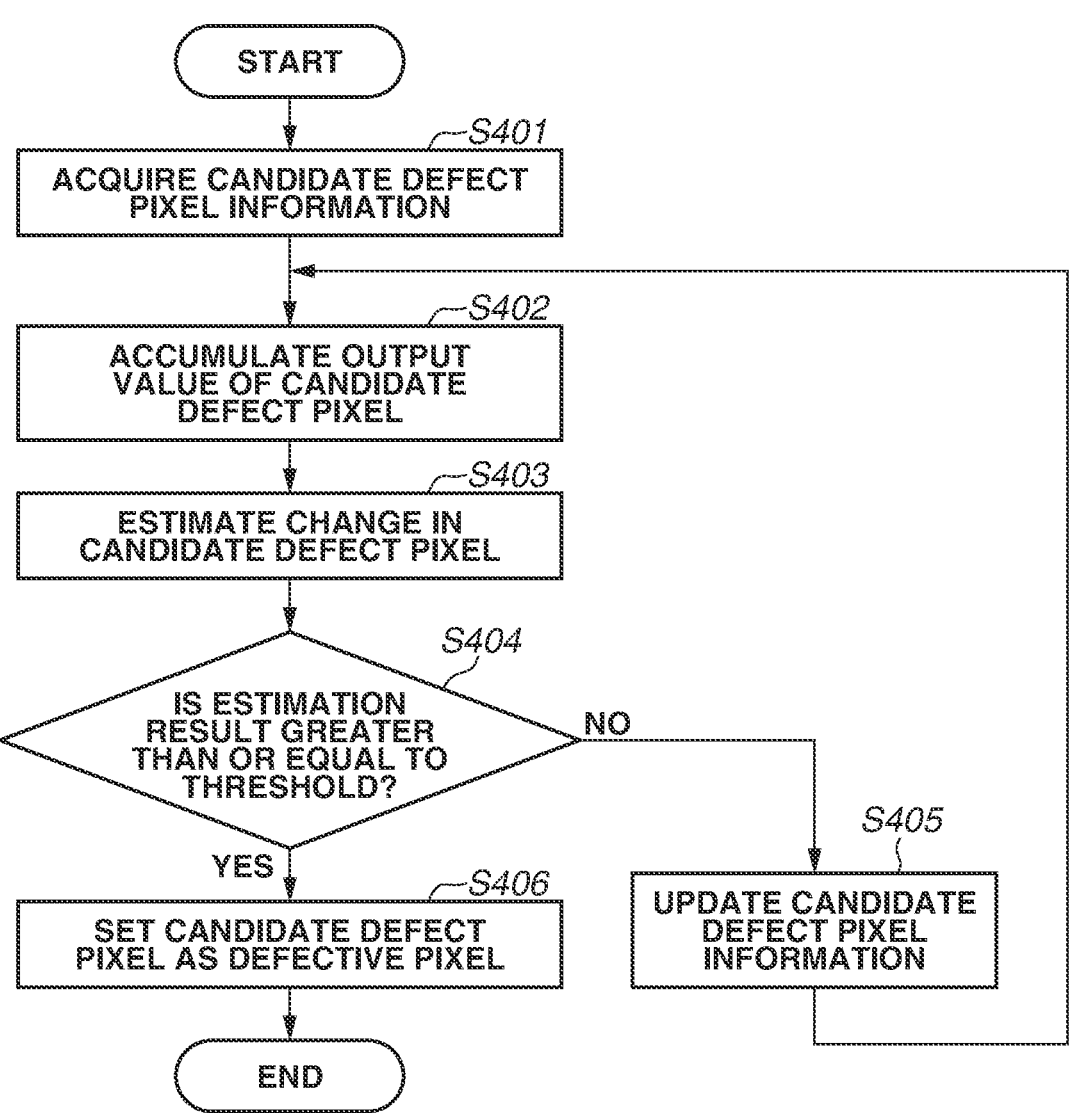
FIG. 4 is a flowchart illustrating a pixel determination process according to the first exemplary embodiment.

FIG. 4 is a flowchart illustrating a pixel determination process of determining whether a pixel is a defective pixel or a candidate defect pixel under an actual environment of use of the imaging apparatus 100 according to the present exemplary embodiment.

Initially, as the operation in step S401, the setting unit 106 acquires the second information, specifically, candidate defect pixel information, from the correction processing-related information stored in the second information the storage unit 107. More specifically, the setting unit 106 acquires the "X Position" information, the "Y Position"

information, and the "Value" information about each pixel with the "Defect ID" that is "0" in FIG. 3. This operation in step S401 is performed during, for example, activation of the imaging apparatus 100.

Next, as the operation in step S402, the setting unit 106 identifies the candidate defect pixel in the two-dimensional image data output from the image sensor 102 based on the position information (X Position and Y Position) for the candidate defect pixel, extracts an output value of the candidate defect pixel, and accumulates the value. In performing the accumulation, the output value may be accumulated without change if a sufficient storage area is secured, or the output value may be reduced by, for example, dividing the output value data and then the accumulation may be performed to reduce the storage area.

Next, as the operation in step S403, the setting unit 106 estimates a current dark output value of the candidate defect pixel based on a result of the accumulation in step S402, the rate of change with respect to the number of times an avalanche phenomenon occurs in the image sensor 102, and the initial value (value of "Value") of the dark output value of the candidate defect pixel.

Next, as the operation in step S404, the setting unit 106 determines whether the estimation value for the dark output value that is acquired in step S403 is greater than or equal to the defective pixel determination threshold, and if the estimation value is less than the threshold (NO in step S404), the processing proceeds to step S405. In step S405, the setting unit 106 updates the information about the candidate defect pixel serving as a target of the determination. Specifically, the value of "Value" of the candidate defect pixel with the "Defect ID" that is "0" in FIG. 3 stored in the storage unit 107 is overwritten with the estimation value acquired in step S403. Thereafter, the processing returns to step S402.

In a case where the setting unit 106 determines that the estimation value for the dark output value that is acquired in step S403 is greater than or equal to the defective pixel determination threshold (YES in step S404), the processing proceeds to step S406. In step S406, the setting unit 106 updates the information in the storage unit 107 so that the candidate defect pixel with the estimation value for the dark output value that is determined to be greater than the defective pixel determination threshold is treated as a defective pixel. More specifically, the value of "Defect ID" in FIG. 3 is changed from "0" to "1". After the processing of step S406 ends, the processing in the flowchart in FIG. 4 on the determination target candidate defect pixel is completed.

After the foregoing process, the correction unit 103 of the imaging apparatus 100 performs correction processing on the defective pixels based on the information stored in the storage unit 107. Specifically, in this case, the correction unit 103 performs defect correction processing also on the pixel changed from a candidate defect pixel to a defective pixel through the above-described process.

Since the image sensor 102 is predicted to include a plurality of candidate defect pixels, the processing in the flowchart in FIG. 4 is performed on each candidate defect pixel.

In performing the processing on each candidate defect pixel, the pixels on the image sensor 102 may be divided into a plurality of predetermined pixel groups, and the processing may be performed on the plurality of predetermined pixel groups simultaneously, or the processing may be performed on the pixels of each pixel group sequentially. Which processing is to be performed is selectable based on implementation of the setting unit 106. In the case of simultaneously performing the process on the image groups, for example, a configuration that performs simultaneous and parallel processing using a CPU including a parallel processing mechanism or a plurality of identical logic circuits is conceivable. In the case of sequentially performing the process on each of a plurality of divided pixel groups, for example, a configuration that performs sequential processing using a CPU including a single processing system is conceivable. In the case of sequentially performing the process, computation processing intervals between pixels are to be prevented from increasing excessively. For example, in the case of sequentially performing the process, if the number of processing target pixels increases and a time that has passed from the computation on a pixel to the next computation on the same pixel is relatively long, an output value of a target pixel, which is used for use time estimation, may be missed during the time. With the computation time interval is about several frames in moving image capturing, there is a low possibility of a significant change in exposure condition, so that an impact during the time interval can be inferred from analogy. However, in a case where the computation time interval is so long that the analogy is impossible, in one embodiment, at least the accumulation of output values of the pixels is always performed or to increase the number of parallel processes so that the computation time interval no longer has an impact on the estimation.

As described above, in the imaging apparatus 100 according to the first exemplary embodiment, the defective pixel correction processing is applicable even in a case where an output value changes as a time of use increases. More specifically, it becomes possible to perform correction processing on a candidate defect pixel as a defective pixel in a case where the candidate defect pixel is determined to be treated as a defective pixel based on an estimation value of a change in output value with increased time of use.

A second exemplary embodiment of the disclosure will be described below. In the above-described example according to the first exemplary embodiment, output values of all candidate defect pixels of the image sensor 102 are accumulated, and an estimation value of an output value that changes with increased time of use is calculated using the accumulate results. In a below-described example according to the second exemplary embodiment, candidate defect pixels are classified into grades based on dark output values, and an estimation value of an output value that changes with time of use is calculated for a representative pixel in an image group of each grade, thus reducing an accumulation processing amount and an accumulation result data amount. The imaging apparatus 100 according to the second exemplary embodiment has a configuration similar to those illustrated in FIGS. 1 and 2 described above, so that illustrations thereof are omitted. Only processes different from the first exemplary embodiment will be described below.

According to the second exemplary embodiment, the correction processing-related information includes information indicating defect types for the respective pixels, information about positions in the two-dimensional image, information indicating grades for the defect types of the pixels, and information about dark output values for the pixel groups to which the grades are assigned.

FIGS. 5A and 5B are diagrams illustrating an example of correction processing-related information according to the second exemplary embodiment. As illustrated in FIG. 5A, the storage unit 107 stores "No." (pixel number) a pixel, followed by information represented by "Defect ID", "X Position", "Y Position", and "Grade" in this order from the left. The information represented by "No.", the "X Position", and the "Y Position" correspond to the above-described examples in FIG. 3. Further, in the examples in FIGS. 5A and 5B, the symbol "*" in a field indicates the presence of some information in the field, as in FIG. 3. In the examples in FIG. 5A**, the "Defect ID" that is "1" indicates a defective pixel, whereas the "Defect ID" that is "2" indicates a candidate defect pixel. While the "Defect ID" information indicating defect types includes "1" as an ID (identification information) indicating a defective pixel and "2" as an ID (identification information) indicating a candidate defect pixel, defect types other than the two defect types, namely, defective pixel and candidate defect pixel, is also includable. In a case where the number of defect types for each pixel thus increases, the number of IDs of the "Defect ID" can be increased to the number of defect types.

The "Grade" information indicates grades for the dark output values of the candidate defect pixels. As illustrated in FIG. 5B, the "Value" information indicating the dark output values for the pixel groups to which the "Grade" information is assigned is stored in association with the "Grade" information. The "Grade" of a candidate defect pixel is assigned a value in accordance with a margin to the defective pixel determination threshold for determining whether a pixel is a defective pixel with time of use. In other words, the margin is a value indicating an amount of margin beyond which the dark output value (i.e., characteristic in the no-incident-light state) of the candidate defect pixel changes to the dark output value (i.e., characteristic in the no-incident-light state) of the defective pixel. While the letters A, B, and E are used for description in the "Grade" fields in FIGS. 5A and 5B, the letters are merely for description and are not a limitation.

As described above, the candidate defect pixels with the "Defect ID" of "2" that are assigned the same "Grade", in other words, the pixels with the same margin to the defective pixel determination threshold, are treated as the same group according to the present exemplary embodiment. The dark output value estimation and the determination as to whether to treat a pixel as a defective pixel based on the estimation results are performed collectively on the pixels determined to belong to the same group. According to the present exemplary embodiment, a representative pixel is selected from the pixels determined to belong to the same group, and the dark output value estimation and the determination as to whether to treat a pixel as a defective pixel based on the estimation results are performed on the representative pixel.

A representative pixel can be set, for example, in storing the correction processing-related information in the storage unit 107 during manufacturing of the imaging apparatus 100. Alternatively, the representative pixels may be extracted at a predetermined ratio to avoid deviations from a current candidate defect pixel distribution, or a pixel close to an average value may be extracted from each pixel group. Yet alternatively, an estimation value of a dark output value of a representative pixel of a pixel group may be, for example, an average of estimation values of dark output values of each pixel of the pixel group.

Timings and methods for the representative pixel selection are not limited to the examples described above.

Performing the dark output value estimation and the determination as to whether to treat a pixel as a defective pixel, based on a representative pixel of the pixels in a group as described above eliminates the need to store in the storage unit 107 dark output values of all the pixels of the pixel group, which reduces a necessary storage capacity. Further, the dark output value estimation is performed on not all the pixels in the pixel group but on only the representative pixel of the pixel group, and the estimation result is set to an estimation value of a dark output value of the pixel group, which reduces the amount of computation in the estimation process.

Figure 6:
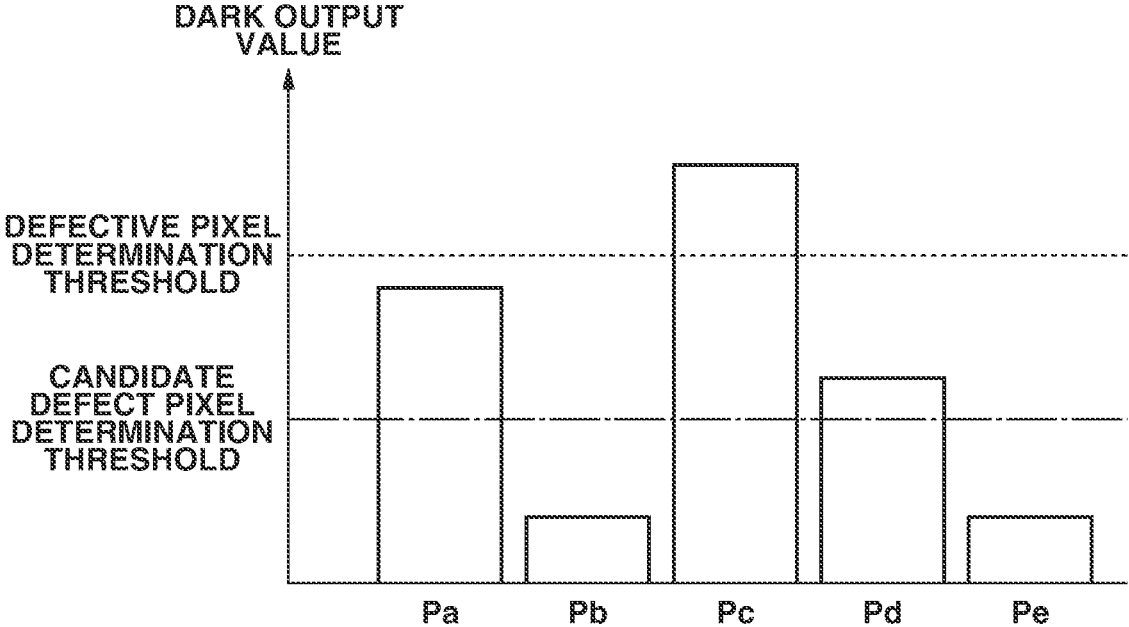
FIG. 6 is a diagram for use in describing grade assignment.

FIG. 6 is a diagram for use in describing the "Grade" assignment described above. In FIG. 6, dark output values of five adjacent pixels Pa to Pe extracted from a portion on the image sensor 102 are illustrated in this order side by side from the left. The defective pixel determination threshold and the candidate defect pixel determination threshold are also illustrated in FIG. 6. Specifically, in the example in FIG. 6, the pixel Pc is greater than the defective pixel determination threshold and is thus treated as a defective pixel, whereas the pixels Pa and Pd are less than the defective pixel determination threshold and greater than the candidate defect pixel determination threshold and are thus treated as candidate defect pixels. Since there is a difference between the dark output values of the pixels Pa and Pd, the margins of the pixels Pa and Pd to the defective pixel determination threshold differ from each other. In the example in FIG. 6, the margin of the pixel Pa to the defective pixel determination threshold is smaller than the margin of the pixel Pd to the defective pixel determination threshold.

Further, since the pixels Pa to Pe are adjacent to each other on the image sensor 102 as described above, similar amounts of light are likely to enter the pixels Pa to Pe in image capturing, so that changes based on the number of times an avalanche phenomenon occurs with exposure are predicted to be similar. However, since the margin of the pixel Pa which is a candidate defect pixel to the defective pixel determination threshold is smaller than the margin of the pixel Pd which is a candidate defect pixel to the defective pixel determination threshold, the pixel Pa is likely to reach a state where the pixel Pa is to be treated as a defective pixel before the pixel Pd. Specifically, while the pixels Pa and Pd are both candidate defect pixels, in one embodiment, the pixels Pa and Pd are distinguished from each other. Thus, according to the present exemplary embodiment, the distinguishment is realized using the "Grade" (margin) described above.

Figure 7:
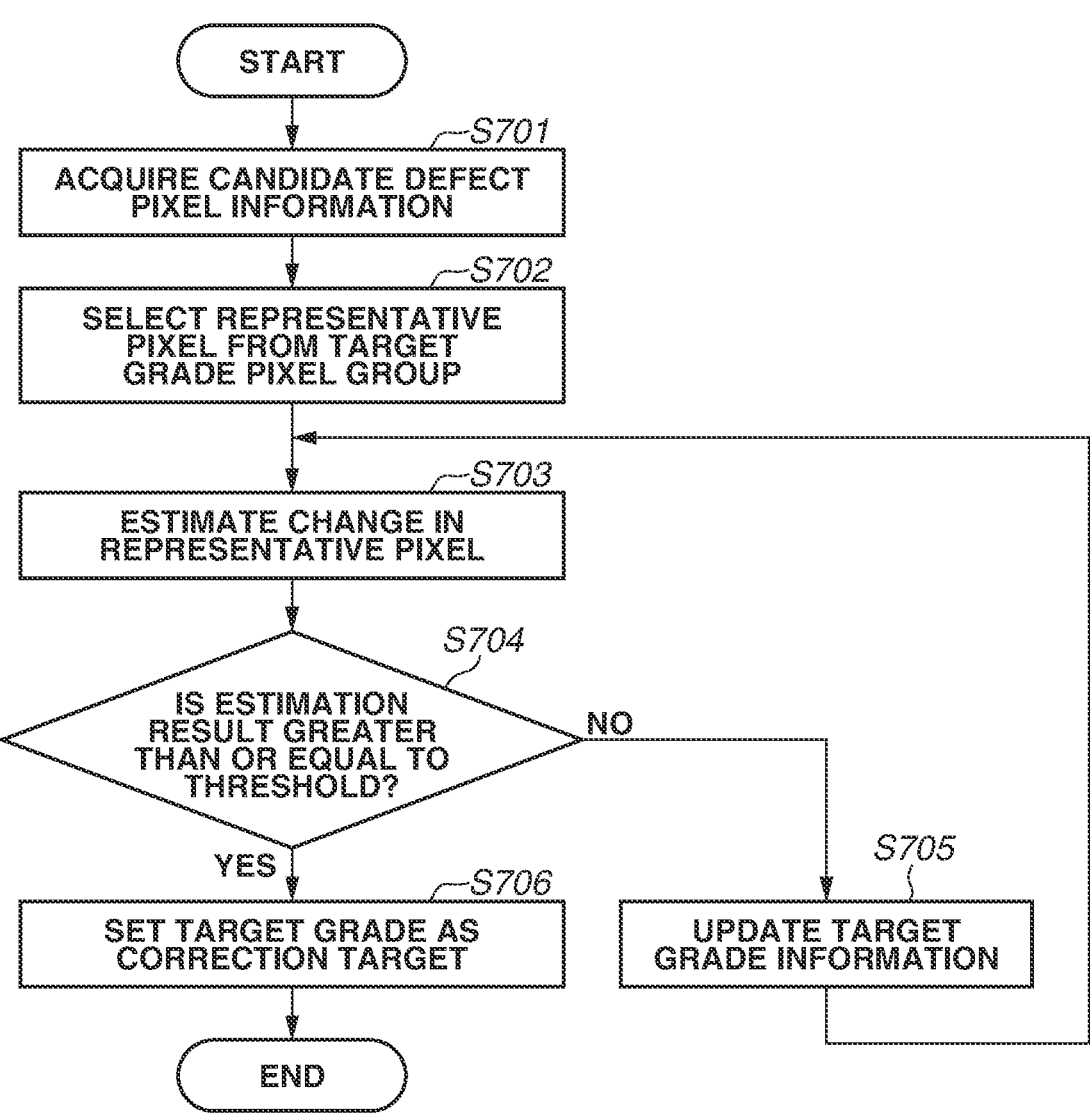
FIG. 7 is a flowchart illustrating a pixel determination process according to the second exemplary embodiment.

FIG. 7 is a flowchart illustrating a pixel determination process of determining whether a pixel is a defective pixel or a candidate defect pixel in the imaging apparatus 100 according to the second exemplary embodiment.

Initially, as the operation in step S701, the setting unit 106 acquires the second information, namely, candidate defect pixel information, from the correction processing-related information stored in the second information the storage unit 107.

Specifically, the setting unit 106 acquires the "X Position" information, the "Y Position" information, the "Grade" information, and the "Value" information about the pixels with the "Defect ID" that is "2" in FIG. 5A. This operation in step S701 is performed during, for example, activation of the imaging apparatus 100.

Next, as the operation in step S702, the setting unit 106 extracts pixels of the same "Grade" from candidate defect pixels indicated by the candidate defect pixel information acquired in step S701, groups the extracted pixels as an image group, and selects a representative pixel as a dark output value estimation target from the image group.

Next, as the operation in step S703, the setting unit 106 estimates a change in dark output value of the representative pixel with increased time of use. The estimation uses a method similar to the estimation value calculation method according to the first exemplary embodiment. Specifically, the setting unit 106 calculates an estimation value of a current dark output value based on an output accumulation result of the representative pixel, the rate of change with respect to the number of times an avalanche phenomenon occurs, and the initial value of the dark output value.

Next, as the operation in step S704, the setting unit 106 determines whether the estimation value calculated in step S703 is greater than or equal to the defective pixel determination threshold, and in a case where the estimation value is not greater than or equal to the threshold (NO in step S704), the processing proceeds to step S705. In step S705, the setting unit 106 updates the candidate defect pixel information about the pixel group to which the representative pixel belongs. More specifically, the "Value" information among the "Grade" information and the "Value" information about of the pixel group in FIG. 5B is overwritten with the estimation value of "Value", and thereafter the processing returns to step S702.

In a case where the setting unit 106 determines that the estimation value calculated in step S704 is greater than or equal to the defective pixel determination threshold (YES in step S704), the processing proceeds to step S706. In step S706, the setting unit 106 updates the information in the storage unit 107 so that the candidate defect pixels of the pixel group to which the representative pixel belongs are treated as defective pixels. More specifically, the value of the "Defect ID" of the candidate defect pixel corresponding to the "Grade" of the pixel group in FIG. 5A is changed from "2" to "1". Consequently, the pixels of the pixel group are treated as defective pixels. After the operation in step S706 ends, the processing in the flowchart in FIG. 7 is completed.

After the above-described processing, the correction unit 103 of the imaging apparatus 100 performs correction processing on the defective pixels based on the information stored in the storage unit 107. Specifically, the correction unit 103 performs defect correction processing targeting also on the pixels that have been changed to be set from a candidate defect pixel to a defective pixel through the above-described process.

While the setting unit 106 updates the information in FIGS. 5A and 5B in step S706 in the example described above, this is not a limiting example. For example, a configuration that enables transmission of information from the setting unit 106 to the correction unit 103 may be provided, and then the setting unit 106 may notify the correction unit 103 of a grade of candidate defect pixels to be set as correction target defective pixels. The correction unit 103 that has received the notification performs correction processing on the candidate defect pixels having the "Grade" value indicated by the notification as correction target defective pixels.

According to the second exemplary embodiment, the above-described process is performed to make it possible to apply the defect correction processing to pixels that become defective pixels with increased time of use while reducing the data amount and the processing amount.

A third exemplary embodiment of the disclosure will be described below. In the above-described examples according to the first and second exemplary embodiments, the exposure on each pixel is focused and a change in output value with increased time of use is estimated. In a below-described example according to the third exemplary embodiment, an exposure effect is evaluated for the entire data corresponding to a two-dimensional image output from the image sensor 102 or for each of a plurality of divided regions of the two-dimensional image, and a change in output value with increased time of use is estimated based on the evaluation values. Specifically, according to the third exemplary embodiment, a change in output value of each candidate defect pixel in the entire two-dimensional image or in each of the plurality of divided regions of the two-dimensional image with increased time of use is estimated from the evaluation values obtained by evaluating an exposure effect for the entire two-dimensional image or for each of the plurality of divided regions of the two-dimensional image. This makes it possible to reduce the amount of computation and the computation result storage capacity as compared with the examples according to the first and second exemplary embodiments. The imaging apparatus 100 according to the third exemplary embodiment has a configuration similar to those illustrated in FIGS. 1 and 2 described above, so that illustrations thereof are omitted. Only differences from the first and second exemplary embodiments will be described below.

FIGS. 8A to 8C are diagrams illustrating an example of correction processing-related information stored in the storage unit 107 according to the third exemplary embodiment. While FIG. 8A is basically similar to FIG. 5A and FIG. 8B is basically similar to FIG. 5B, the following points are different. In FIG. 8A, the IDs of "Defect ID" indicating a candidate defect pixel further include "3" in addition to "2". Furthermore, as illustrated in FIG. 8C, "Rate" information indicating rates of change in output value of the candidate defect pixels with time of use is added in association with the "Defect ID" of the candidate defect pixels. More specifically, according to the third exemplary embodiment, numerical values that can adapt to a plurality of "Rate" which indicates rate of change in output value with time of use are prepared as the "Defect ID" of the candidate defect pixels.

Figure 9:
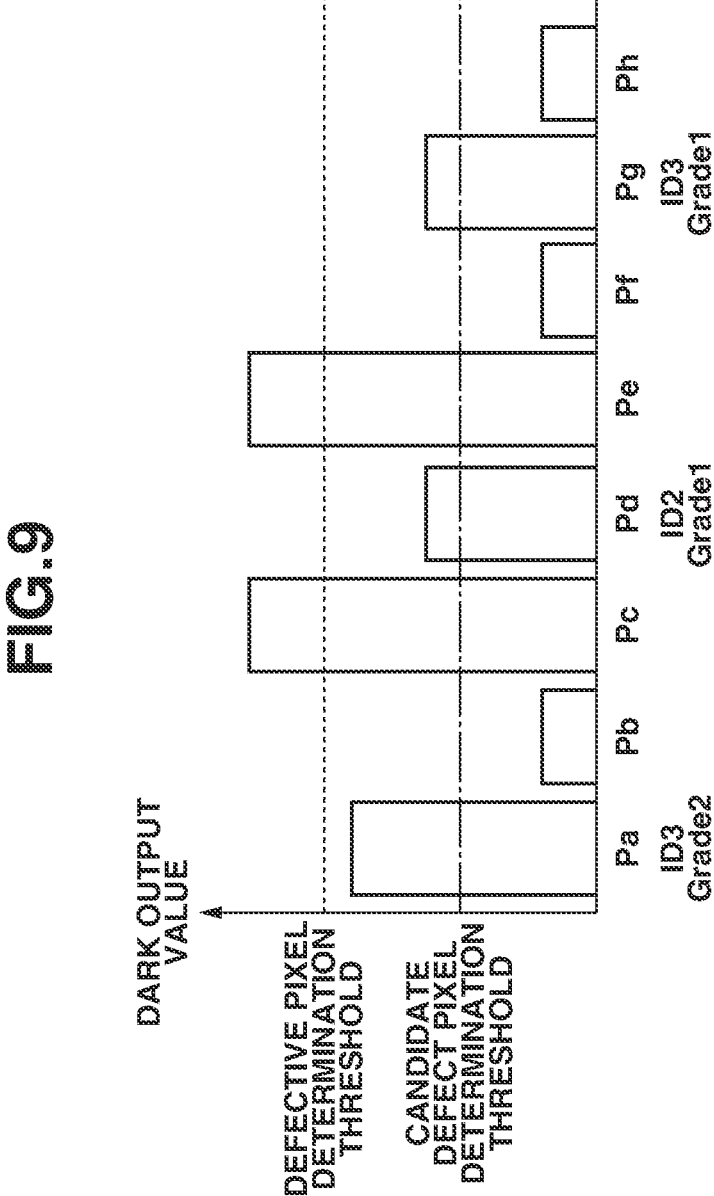
FIG. 9 is a diagram for use in describing defect identifications (defect IDs) for rates.

FIG. 9 is a diagram for use in describing that a plurality of "Defect IDs" of the candidate defect pixels is prepared for the "Rate" according to the third exemplary embodiment. In FIG. 9, dark output values of eight adjacent pixels Pa to Ph extracted from a portion on the image sensor 102 are illustrated in this order side by side from the left. Further, the defective pixel determination threshold and the candidate defect pixel determination threshold are also illustrated in FIG. 9. In the example in FIG. 9, the pixels Pc and Pe are greater than the defective pixel determination threshold and are thus treated as defective pixels, whereas the pixels Pa, Pd, and Pg are less than the defective pixel determination threshold and greater than the candidate defect pixel determination threshold and are thus treated as candidate defect pixels. The candidate defect pixels (pixels Pa, Pd, and Pg) are assigned a "Defect ID" indicating a candidate defect pixel, and the assignment to the candidate defect pixels is performed to adapt to the "Rate" assuming the rate of change in output value with time of use.

A description will be provided focusing the pixels Pd and Pg which are candidate defect pixels. While the two pixels Pd and Pg have similar dark output values in the example in FIG. 9, the pixels Pc and Pe with great dark output values are adjacent to the pixel Pd.

Meanwhile, crosstalk in which secondary electrons resulting from an avalanche phenomenon enter adjacent pixels as described above may occur in an image sensor including APDs. Specifically, the avalanche phenomenon generates secondary electrons as many times as the number of times of correlations with output values in an APD of a pixel of interest, and the generated secondary electrons enter an adjacent pixel and cause crosstalk in which an output value of the adjacent pixel also increases. Hereinafter, an effect of the crosstalk will be referred to as "crosstalk effect".

In an image sensor including APDs, dark output values change dependently on the number of times an avalanche phenomenon occurs. Thus, the dark output values of the pixels Pc and Pe that are the defective pixels and originally have great dark output values change faster than the dark output values of the other pixels illustrated in FIG. 9.

Thus, in the pixel Pd that is adjacent to the pixels Pc and Pe with great dark output values and is susceptible to a crosstalk effect, the number of times an avalanche phenomenon occurs increases, as compared with the pixel Pg having a similar initial value of a dark output value, and the change in dark output value of the pixel Pd is estimated to become faster.

Thus, according to the third exemplary embodiment, a "Rate" indicating a rate of change is set for each candidate defect pixel based on dark output values of pixels adjacent to the candidate defect pixel. According to the present exemplary embodiment, pixels with "Rate" values that are close to each other are grouped and assigned "Defect ID", and a "Rate" is determined for each "Defect ID" of the same values based on the values of "Rate" of the pixels of the group. The information about "Defect ID" and the "Rate" can be created during manufacturing of the imaging apparatus 100 or based on user instructions and is updatable, as in the above-described exemplary embodiments.

In the example in FIG. 9, the candidate defect pixels Pa and Pg estimated to be lower in change speed than the candidate defect pixel Pd estimated to be higher in change speed based on effects of adjacent pixels are assigned a different "Defect ID" value. The pixels Pa and Pg assigned the same "Defect ID" value are assigned different "Grade" values based on the margins to the defective pixel determination threshold, as in the second exemplary embodiment described above.

While an example of assigning "Defect ID" to each pixel is described above, an exposure effect is calculated as an evaluation value for each of a plurality of divided regions of a two-dimensional image according to the present exemplary embodiment as described above at the top. Thus, according to the present exemplary embodiment, further detailed assignment is performed as described below.

Figure 10:
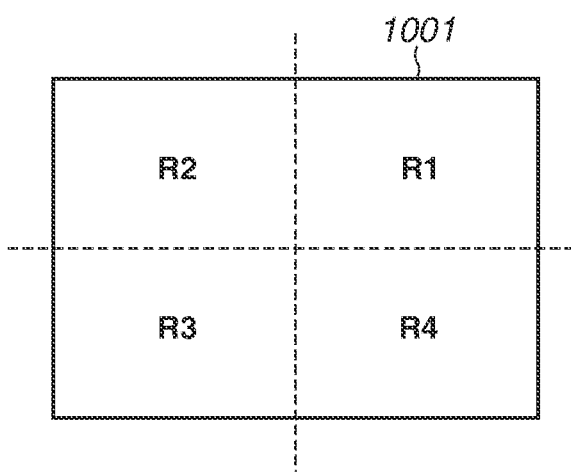
FIG. 10 is a diagram illustrating an example of a divided two-dimensional image.

FIG. 10 is a diagram illustrating an example of calculating an evaluation value for each of four divided regions R1 to R4 of a two-dimensional image 1001 output from the image sensor 102. For simplification of description, output values of pixels of the regions R1 to R4 are assumed to be uniform. In FIG. 10, the region R1 has the greatest output value, and the output values of the regions R2, R3, and R4 decrease anti-clockwise in this order. Furthermore, in this situation, for example, the regions R1 and R4 each include a single pixel with the same dark output value, the dark output values meet the level to be treated as a candidate defect pixel, and crosstalk effect from adjacent pixels are regarded as the same. In a case where the same "Defect ID" and the same "Grade" are assigned to the pixels, since the evaluation values for the regions R1 to R4 differ from each other, the effect of the time of use on the pixels in the region R1 differs from the impact of the time of use on the pixels in the region R4. Thus, it is unsuitable to treat the pixels as pixels belonging to the same group in the situation.

In order to prevent the above-described situation, for example, target pixels are treated as pixels belonging to different groups based on information indicating positions of the pixels and division information about the regions according to the present exemplary embodiment. Further, as another example, pixels belonging to different regions can be treated as different groups by not assigning the same "Defect ID" to the pixels. The above-described processes are unnecessary in a case where the two-dimensional image is not divided.

Figure 11:
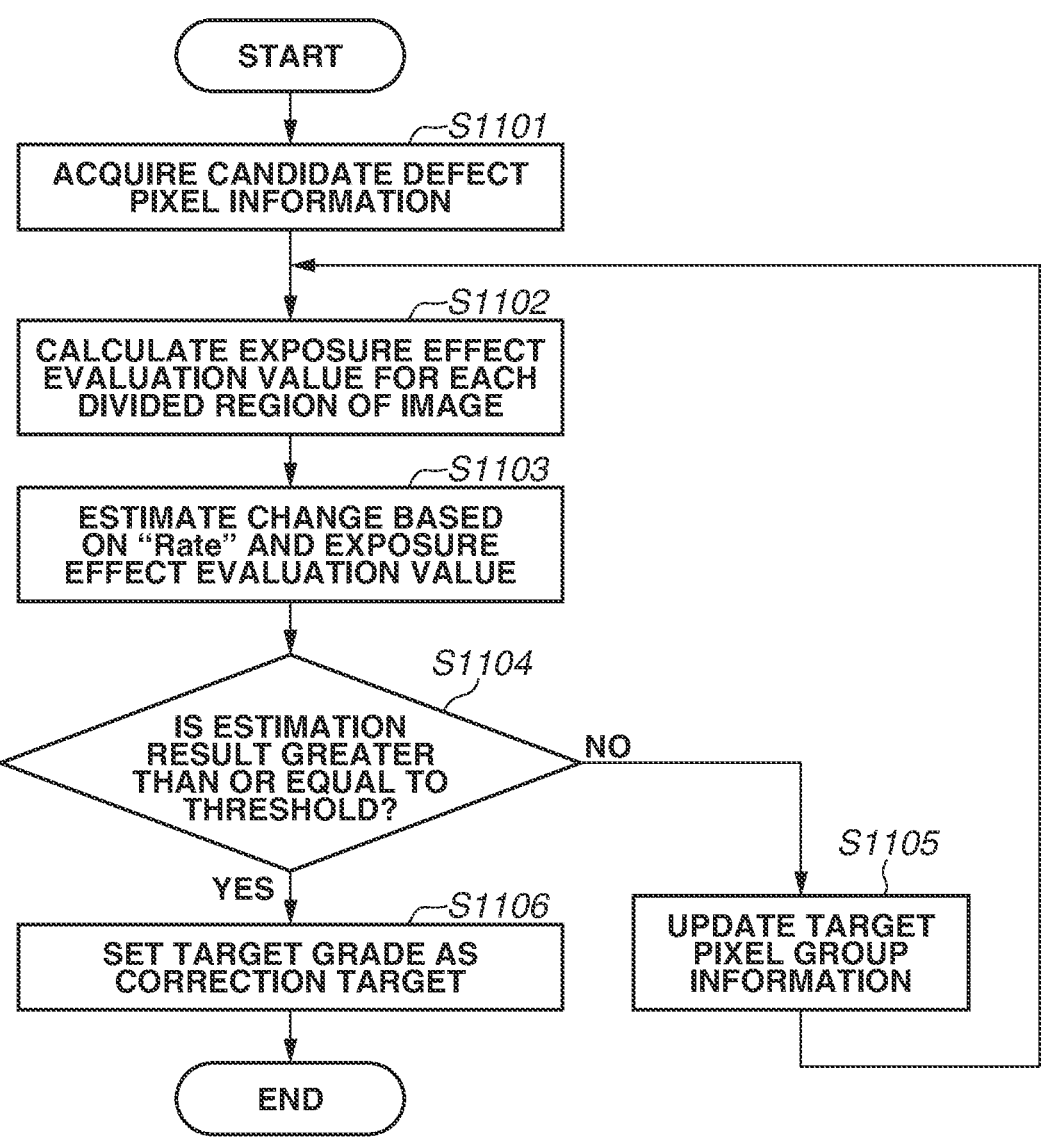
FIG. 11 is a flowchart illustrating a pixel determination process according to the third exemplary embodiment.

FIG. 11 is a flowchart illustrating a pixel determination process in the imaging apparatus 100 according to the third exemplary embodiment.

Initially, as an operation in step S1101, the setting unit 106 acquires the second information, specifically, candidate defect pixel information, from the correction processing-related information stored in the second information storage unit 107. More specifically, the setting unit 106 acquires the "X Position" information, the "Y Position" information, the "Grade" information, the "Value" information, and the "Rate" information about each pixel with the "Defect ID" that is "2" or "3" in FIGS. 8A to 8C. This operation in step S1101 is performed, for example, during activation of the imaging apparatus 100.

Next, as an operation in step S1102, the setting unit 106 divides the two-dimensional image from the image sensor 102 into a plurality of regions and calculates an exposure effect evaluation value for each region. For example, a value obtained by accumulating average values of output values of the pixels is used as an exposure effect evaluation value for each region. As described above, in the image sensor 102 using the APDs, the number of times an avalanche phenomenon occurs affects a change in output value, and a result of counting the number of times an avalanche phenomenon occurs is output as an output value of each pixel. Thus, a result of accumulating average values of output values of the pixels of each region is treated as an evaluation value for use in estimating a change in output value of a target region. The operation in step S1102 is performed on a region including at least one candidate defect pixel, and no calculation is performed for a region without a candidate defect pixel.

Next, as an operation in step S1103, the setting unit 106 estimates a change in output value of the current candidate defect pixel group with time of use based on the exposure effect evaluation value for each region, the "Rate" of each candidate defect pixel included in the region, and the "Value" of the candidate defect pixel group.

Meanwhile, since the change speeds of output values of the candidate defect pixels in each region with time of use differ from each other, there may be candidate defect pixels assigned different "Defect ID" and different "Rate". Thus, the setting unit 106 estimates a current dark output value based on the value assigned to "Value" corresponding to the "Rate" and the "Grade" of each "Defect ID".

For example, the number of times an avalanche phenomenon occurs, specifically, a pixel output value, which affects a change in output value with time of use, is able to be estimated based on an exposure effect evaluation value for each region (an accumulation value of average values of pixel output values in the region). This can be regarded as the number of times an avalanche phenomenon occurs in the calculation target candidate defect pixel in the target region, so that the setting unit 106 multiplies the value by the change rate with respect to the number of times an avalanche phenomenon occurs to determine a change value in dark output value. The setting unit 106 then estimates a current dark output value by adding the change value determined to the immediately previous dark output value.

Next, as an operation in step S1104, the setting unit 106 determines whether the estimation value acquired in step S1103 is greater than or equal to the defective pixel determination threshold. In a case where the estimation value is less than the defective pixel determination threshold (NO in step S1104), the processing proceeds to step S1105, and the setting unit 106 updates the value assigned to "Value" of the candidate defect pixel group with the estimation value. Then, the processing returns to step S1102.

In a case where the setting unit 106 determines that the estimation value is greater than or equal to the threshold (YES in step S1104), the processing proceeds to step S1106. In step S1106, the setting unit 106 updates the information in the storage unit 107 so that the candidate defect pixel group is treated as defective pixels. More specifically, the setting unit 106 changes, for example, the value of "Defect ID" to the ID for defective pixels. Alternatively, as in the above-described exemplary embodiments, a configuration that enables transmission of information from the setting unit 106 to the correction unit 103 may be provided, and then the setting unit 106 may notify the correction unit 103 of a grade of the candidate defect pixels to be set as a correction target.

According to the third exemplary embodiment, the above-described process is performed to make it possible to reduce the amount of computation and the computation result storage capacity as compared with the examples according to the first and second exemplary embodiments.

A fourth exemplary embodiment of the disclosure will be described. A process according to a fourth exemplary embodiment in a case where a zero level serving as a reference for image information is changed in the imaging apparatus 100 will be described below.

Figure 12:
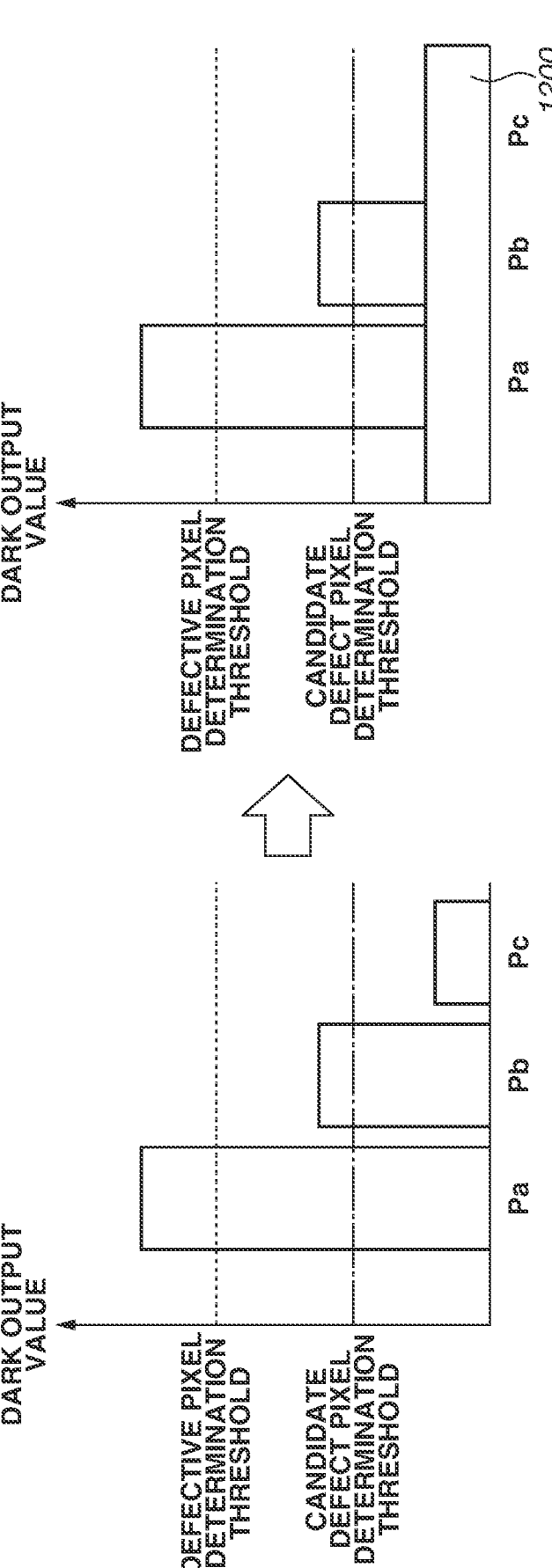
FIG. 12 is a diagram for use in describing a change in a zero level serving as a reference for image information.

FIG. 12 is a diagram illustrating an example in which a zero level used as a reference for image information is changed. The left in FIG. 12 illustrates an example of an arrangement of three pixels Pa, Pb, and Pc that are adjacent on a two-dimensional image and extracted. The right in FIG. 12 illustrates a case where a zero level serving as a reference in the example in which the same three adjacent pixels Pa, Pb, and Pc are arranged is changed. In FIG. 12, the defective pixel determination threshold and the candidate defect pixel determination threshold are also illustrated as examples. In the example on the right in FIG. 12, a change portion 1200 indicates an amount of change in zero level, and the top of the change portion 1200 indicates a new zero level. A cause of the foregoing event can be, for example, a shift in reference output due to a change in circuit characteristics in the image sensor 102 or an increase in constantly-output noise components due to a temperature change caused by an increased time of use of the image sensor 102. More specifically, the zero level may shift upward or downward as the temperature increases or decreases. Further, as another example, the zero level may change due to a change in pixel characteristics as a result of accumulating exposure effects with increased time of use. Furthermore, the zero level may change due to various other factors, such as a configuration or a characteristic of the image sensor 102.

In a case where the zero level changes as described above, the defective pixel (pixel Pa) and the candidate defect pixel (pixel Pb) may not satisfy a defective pixel determination condition and a candidate defect pixel determination condition based on the changed zero level as illustrated in FIG. 12. Furthermore, there may be a case where the defective pixel determination condition and the candidate defect pixel determination condition are satisfied more rapidly than an expected change with the time of use.

Figure 13:
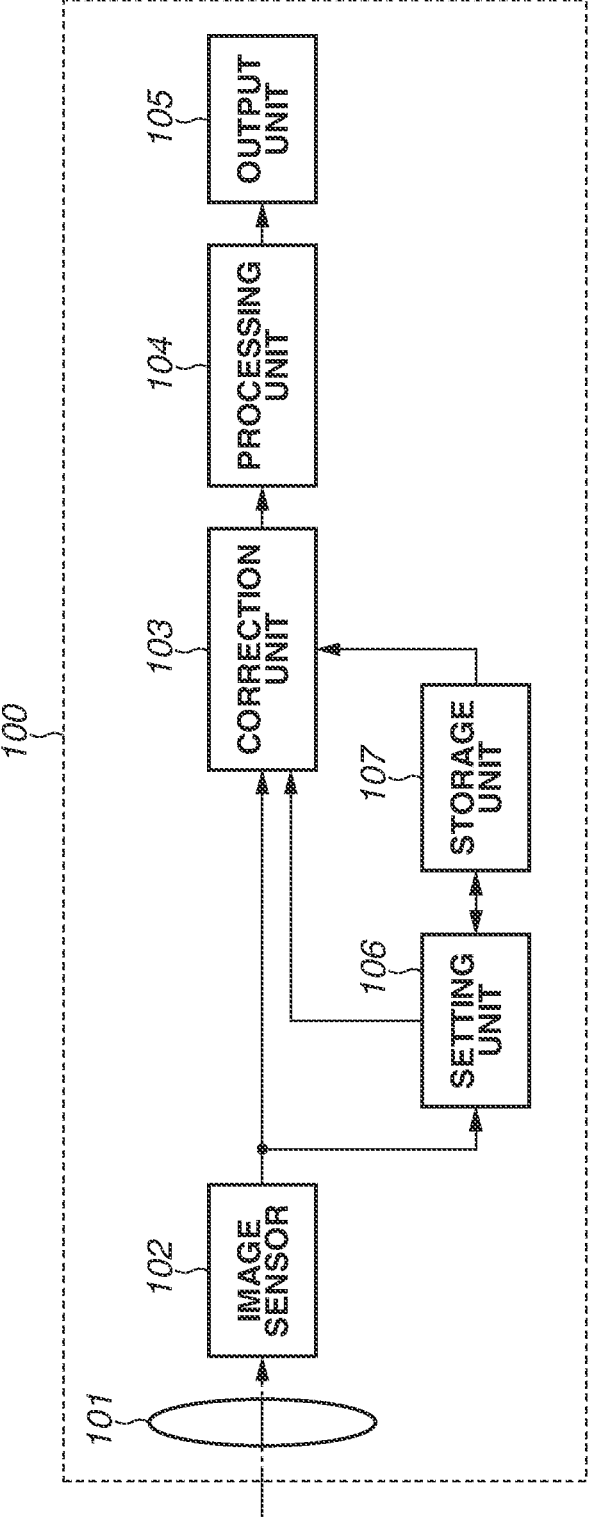
FIG. 13 is a diagram illustrating an example of a functional configuration of an imaging apparatus according to a fourth exemplary embodiment.

FIG. 13 is a diagram illustrating an example of a configuration of the imaging apparatus 100 according to the fourth exemplary embodiment. Redundant descriptions of components of the imaging apparatus 100 according to the fourth exemplary embodiment that are similar to those according to the above-described exemplary embodiments are omitted, and only differences will be described below.

The configuration illustrated in FIG. 13 is different from the configuration in FIG. 1 in that information can be transmitted and received between the setting unit 106 and the correction unit 103. Further, according to the fourth exemplary embodiment, the correction processing-related information stored in the storage unit 107 is similar to the information described above with reference to FIGS. 8A to 8C.

Figure 14:
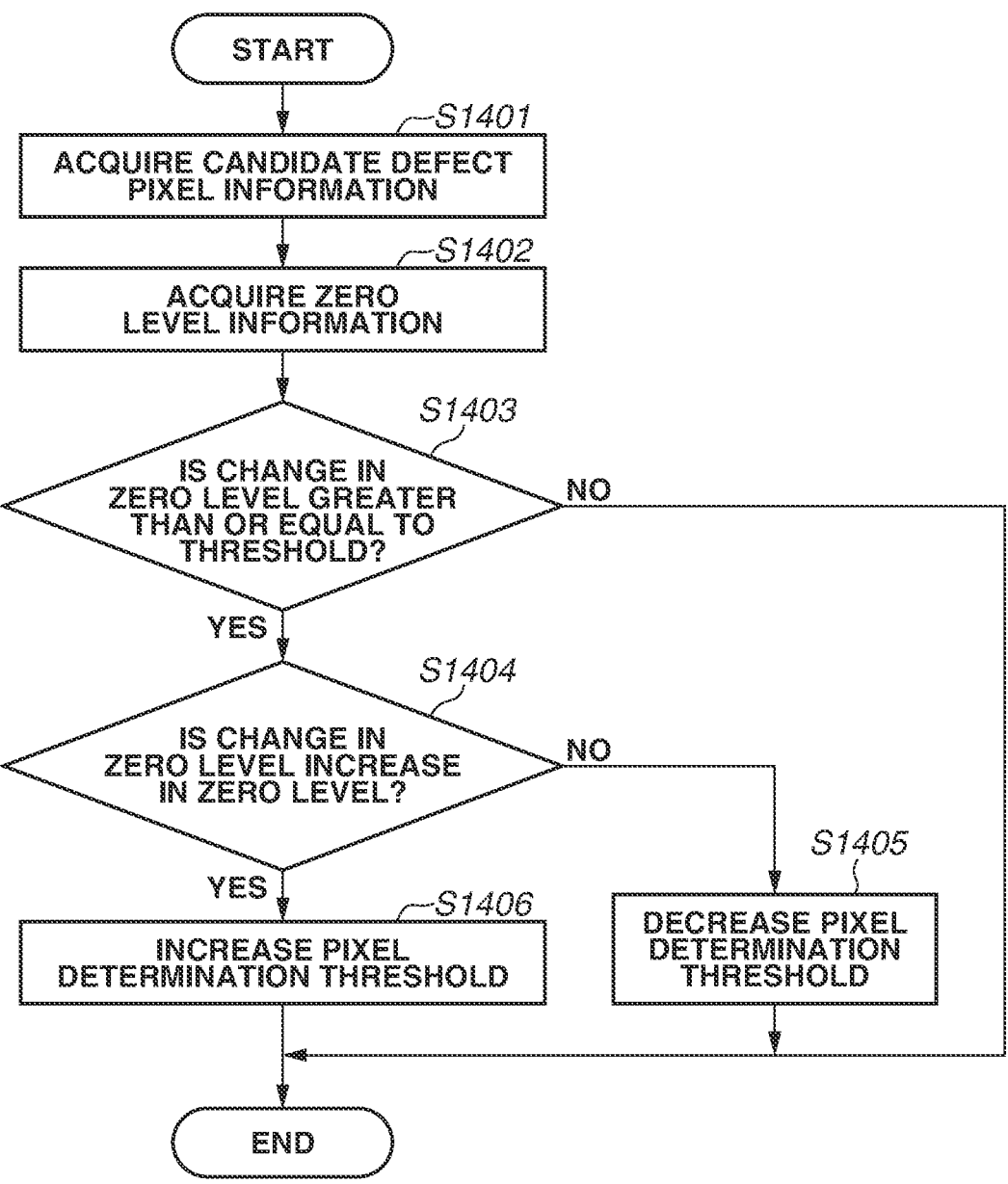
FIG. 14 is a flowchart illustrating a zero level change determination process.

FIG. 14 is a flowchart illustrating processing of determining a change in zero level in the imaging apparatus 100 according to the fourth exemplary embodiment.

Initially, as an operation in step S1401, the setting unit 106 acquires the second information, specifically, candidate defect pixel information, from the correction processing-related information stored in the second information the storage unit 107. More specifically, the setting unit 106 acquires the "X Position" information, the "Y Position" information, the "Grade" information, the "Value" information, and the "Rate" information for each pixel with the "Defect ID" that is "2" or "3" in FIGS. 8A to 8C. The operation in step S1401 is performed, for example, during activation of the imaging apparatus 100.

Next, as an operation in step S1402, the setting unit 106 acquires zero level information about the two-dimensional image. Any method may be used in the zero level information acquisition. For example, the setting unit 106 may acquire a zero level based on output values of optical black pixels that are provided in the image sensor 102 and are not photosensitive. Alternatively, in a case where a major cause of a change in zero level is a temperature change due to the characteristics of the image sensor 102, a temperature sensor capable of measuring temperatures of the image sensor 102 may be provided, and the setting unit 106 can estimate a zero level based on an output temperature value of the temperature sensor. Functional units to acquire zero level information are not limited to the setting unit 106 and may be any other functional unit, or a separate functional unit for the zero level acquisition can be provided. In the example according to the present exemplary embodiment, the setting unit 106 acquires zero level information.

Next, as an operation in step S1403, the setting unit 106 compares the zero level information acquired in step S1402 and previously-acquired zero level information, calculates an amount of change in the zero level, and determines whether the amount of change is greater than or equal to a zero level change determination threshold. A value that is predetermined based on the characteristics of the image sensor 102 is used as the zero level change determination threshold. For example, in a case where image generation is performed from a state where output values of the image sensor 102 are small under an actual condition of use of the imaging apparatus 100, even a one-level numerical change in zero level affects images and is expected to also affect the defective pixel determination. Thus, in one embodiment, the zero level change determination threshold in this case is set to a small value.

In a case where the setting unit 106 determines that the amount of change in zero level is not greater than or equal to the zero level change determination threshold (NO in step S1403), the process in the flowchart in FIG. 14 is ended. In a case where the setting unit 106 determines that the amount of change in zero level is greater than or equal to the threshold (YES in step S1403), the processing proceeds to step S1404. In both cases, the latest zero level information is stored in, for example, the storage unit 107 as information (previously-acquired zero level information) for the next calculation of an amount of change in zero level, and thereafter the processing proceeds to the next step.

In step S1404, the setting unit 106 determines whether the change in zero level is an increase in level value or a decrease in level value. In a case where the setting unit 106 determines that the change is a decrease in level value (NO in step S1404), as an operation in step S1405, the setting unit 106 decreases the defective pixel determination threshold and the candidate defect pixel determination threshold by an amount corresponding to the decrease in zero level. In step S1404, in a case where the setting unit 106 determines that the change in zero level is an increase in level value (YES in step S1404), as an operation in step S1406, the setting unit 106 increases the defective pixel determination threshold and the candidate defect pixel determination threshold by an amount corresponding to the increase in zero level.

The zero level change determination process in the flowchart in FIG. 14 is performed at regular intervals, and the defective pixel determination threshold and the candidate defect pixel determination threshold are updated in accordance with changes in zero level. The regular intervals at which the zero level change determination process is performed may be set based on characteristics of changes in zero level of the image sensor 102.

Figure 15:
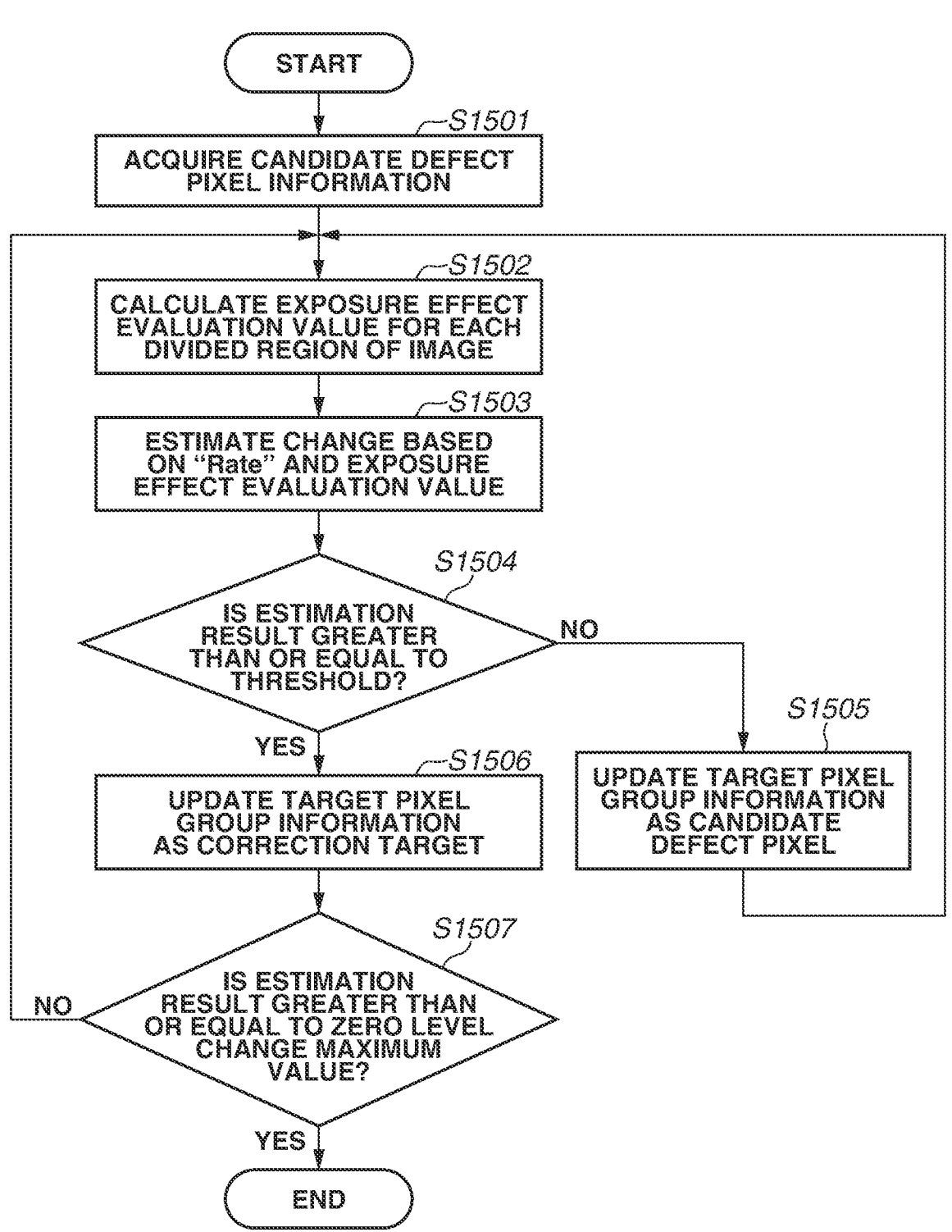
FIG. 15 is a flowchart illustrating a pixel determination process according to the fourth exemplary embodiment.

FIG. 15 is a flowchart illustrating a pixel determination process in the imaging apparatus 100 according to the fourth exemplary embodiment. In the pixel determination process, the amount of change in zero level that is acquired by the zero level change determination process in FIG. 14 is used. In the flowchart in FIG. 15, the operations in steps S1501 to S1503 correspond to those in steps S1101 to S1103 in FIG. 11 described above, and the current dark output value estimation is performed after the acquisition of candidate defect pixel information. After the operation in step S1503, the processing proceeds to step S1504.

In step S1504, the setting unit 106 determines whether the estimation value of the dark output value in step S1503 is greater than or equal to the defective pixel determination threshold. According to the fourth exemplary embodiment, the defective pixel determination threshold used in the determination is a threshold sequentially reflecting changes in zero level through the process in the flowchart in FIG. 14.

In step S1504, in a case where the setting unit 106 determines that the estimation value of the dark output value is less than the defective pixel determination threshold (NO in step S1504), the processing proceeds to step S1505, and the setting unit 106 updates the target pixel group information stored in the storage unit 107. Here, a pixel that is previously determined to be a defective pixel and set to a defect correction target may be determined in step S1504 not to meet the level to be treated as a defective pixel due to the change in zero level as described above, and the operation of step S1505 may be applied to the pixel. In such a case, the setting unit 106 updates the defective pixel information and the "Value" information indicating the estimation value of the current dark output value with respect to the candidate defect pixel information in the storage unit 107 as illustrated in FIG. 9. Furthermore, the setting unit 106 also notifies the correction unit 103 that the "Defect ID" and the "Grade" of the pixel group that is previously notified as a correction target defective pixel are to be excluded from the correction target. After the setting unit 106 ends the information update in step S1505, the processing returns to step S1502.

In step S1504, in a case where the setting unit 106 determines that the estimation value of the dark output value is greater than or equal to the defective pixel determination threshold (YES in step S1504), the processing proceeds to step S1506. In step S1506, the setting unit 106 updates the defective pixel information and the "Value" indicating the estimation value of the current dark output value of the candidate defect pixel information in the storage unit 107 as illustrated in FIG. 9. Furthermore, the setting unit 106 notifies the correction unit 103 that the target pixel group is set as a correction target as a defective pixel. According to the above-described exemplary embodiments, the process of replacing the "Defect ID" of the target candidate defect pixel with the "Defect ID" indicating a defective pixel is described as an example. According to the fourth exemplary embodiment, on the other hand, there may be a case where a pixel that is previously determined to be treated as a defective pixel returns to a pixel to be treated as a candidate defect pixel due to a change in zero level as in the processing of step S1505 described above. In this case, the setting unit 106 does not overwrite the "Defect ID" and notifies the correction unit 103 of pixels to be set as correction targets.

After the processing of step S1506, the processing proceeds to step S1507, and the setting unit 106 determines whether the estimation value of the dark output value that is acquired in step S1505 is greater than or equal to a zero level change maximum value. The determination process is performed to determine whether an irreversible change with the time of use is significant enough not to overturn the determination of treating the pixel as a defective pixel regardless of an increase or decrease in zero level. The zero level change maximum value used as a threshold in the determination processing in step S1506 may be set to adapt to the characteristics of the image sensor 102 and is able to be set based on a maximum assumable range of change after causes of a change in zero level such as a temperature change and a range of change are identified.

In a case where the setting unit 106 determines that the estimation value of the dark output value is greater than or equal to the zero level change maximum value (YES in step S1507), in other words, in a case where the setting unit 106 determines that the target pixel group is not likely to return to a candidate defect pixel even if a change in zero level occurs thereafter, the process on the target pixel is ended. In a case where the setting unit 106 determines that the estimation value of the dark output value is less than the zero level change maximum value (NO in step S1507), in other words, in a case where the setting unit 106 determines that the target pixel group may return to a candidate defect pixel due to an effect of a change in zero level thereafter, the processing returns to step S1502.

According to the fourth exemplary embodiment, the above-described process enables determination as to whether a pixel that may become a defective pixel with increased time of use is to be set to a defect correction target while reflecting an effect of a change in zero level.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-026283, filed Feb. 22, 2023, which is hereby incorporated by reference herein in its entirety.

What is claimed is:

1. An apparatus comprising:
a sensor including a plurality of pixels;
at least one processor; and
a memory coupled to the at least one processor, the memory storing instructions that, when executed by the at least one processor, cause the at least one processor to:
store first information indicating a first pixel to be a target of predetermined correction processing and second information indicating a second pixel to be a target of the predetermined correction processing in a case where a predetermined condition is satisfied, the first pixel and the second pixel being included in the plurality of pixels of the sensor;
set the second pixel to a target of the predetermined correction processing in a case where an estimation value based on an output of the second pixel specified by the second information satisfies the predetermined condition; and
correct, through the predetermined correction processing, a value of the first pixel in an image acquired by the sensor and a value of the second pixel set to be a target of the predetermined correction processing in the image acquired by the sensor,
wherein each pixel of the sensor includes an avalanche photodiode; and
wherein the instructions further cause the one or more processors to acquire an estimation value for the change in the value of the second pixel with the use of the sensor based on the number of times an avalanche phenomenon occurs in the avalanche photodiode of the sensor.

2. The apparatus according to claim 1,
wherein the first pixel outputs a value greater than or equal to a first threshold even in a state without incident light, wherein the second pixel has a characteristic of outputting a value greater than or equal to a second threshold value lower than the first threshold even in the state without incident light, and wherein the predetermined condition is that the estimation value for the second pixel in the state without incident light is greater than or equal to the first threshold.

3. The apparatus according to claim 1, wherein the instructions further cause the one or more processors to correct, through the predetermined correction processing, a value of a pixel specified by the first information in the image acquired by the sensor and a value of a pixel set to a target of the predetermined correction processing based on the second information in the image acquired by the sensor.

4. An apparatus comprising:

a sensor including a plurality of pixels;

at least one processor; and a memory coupled to the at least one processor, the memory storing instructions that, when executed by the at least one processor, cause the at least one processor to:

store first information indicating a first pixel to be a target of predetermined correction processing and second information indicating a second pixel to be a target of the predetermined correction processing in a case where a predetermined condition is satisfied, the first pixel and the second pixel being included in the plurality of pixels of the sensor;

set the second pixel to a target of the predetermined correction processing in a case where an estimation value based on an output of the second pixel specified by the second information satisfies the predetermined condition; and correct, through the predetermined correction processing, a value of the first pixel in an image acquired by the sensor and a value of the second pixel set to be a target of the predetermined correction processing in the image acquired by the sensor, wherein the first pixel outputs a value greater than or equal to a first threshold even in a state without incident light, wherein the second pixel has a characteristic of outputting a value greater than or equal to a second threshold value lower than the first threshold even in the state without incident light, wherein the predetermined condition is that the estimation value for the second pixel in the state without incident light is greater than or equal to the first threshold, wherein the first information includes information indicating a first type indicating that the first pixel is a pixel having a predetermined characteristic and information indicating a position of the first pixel in the image acquired by the sensor, wherein the second information includes information indicating a second type indicating that the second pixel is a pixel having a characteristic with a possibility of becoming the predetermined characteristic, information indicating the value of the second pixel in the state without incident light, and information indicating a position of the second pixel in the image acquired by the sensor, and wherein the instructions cause the one or more processors to update the second type of the stored second information to the first type and update the information indicating the value of the second pixel to the estimation value of the second pixel in a case where the second pixel is set to a target of the predetermined correction processing.

5. The apparatus according to claim 4, wherein the instructions further cause the one or more processors to correct, through the predetermined correction processing, a value of a pixel specified by the stored information indicating the first type in the image acquired by the sensor.

6. An apparatus comprising:

a sensor including a plurality of pixels;

at least one processor; and a memory coupled to the at least one processor, the memory storing instructions that, when executed by the at least one processor, cause the at least one processor to:

store first information indicating a first pixel to be a target of predetermined correction processing and second information indicating a second pixel to be a target of the predetermined correction processing in a case where a predetermined condition is satisfied, the first pixel and the second pixel being included in the plurality of pixels of the sensor;

set the second pixel to a target of the predetermined correction processing in a case where an estimation value based on an output of the second pixel specified by the second information satisfies the predetermined condition; and correct, through the predetermined correction processing, a value of the first pixel in an image acquired by the sensor and a value of the second pixel set to be a target of the predetermined correction processing in the image acquired by the sensor, wherein the instructions further cause the one or more processors to acquire the estimation value of the second pixel specified by the second information based on a time of use of the sensor.

7. A method for controlling an apparatus, the method comprising:

storing first information indicating a first pixel to be a target of predetermined correction processing and second information indicating a second pixel to be a target of the predetermined correction processing in a case where a predetermined condition is satisfied, the first pixel and the second pixel being included in a plurality of pixels of a sensor;

setting the second pixel to a target of the predetermined correction processing in a case where an estimation value based on an output of the second pixel specified by the second information satisfies the predetermined condition; and correcting, through the predetermined correction processing, a value of the first pixel in an image acquired by the sensor and a value of the second pixel set to be a target of the predetermined correction processing in the image acquired by the sensor, wherein each pixel of the sensor includes an avalanche photodiode; and wherein the method further comprises acquiring an estimation value for the change in the value of the second pixel with the use of the sensor based on the number of times an avalanche phenomenon occurs in the avalanche photodiode of the sensor.

8. The method according to claim 7, further comprising correcting, through the predetermined correction processing, a value of a pixel specified by the first information in the image acquired by the sensor and a value of a pixel set to a target of the predetermined correction processing based on the second information in the image acquired by the sensor.

9. The method according to claim 7, wherein the first pixel outputs a value greater than or equal to a first threshold even in a state without incident light, wherein the second pixel has a characteristic of outputting a value greater than or equal to a second threshold value lower than the first threshold even in the state without incident light, and wherein the predetermined condition is that the estimation value for the second pixel in the state without incident light is greater than or equal to the first threshold.

10. A non-transitory computer-readable storage medium storing a program for causing a computer to execute a method comprising:

storing first information indicating a first pixel to be a target of predetermined correction processing and second information indicating a second pixel to be a target of the predetermined correction processing in a case where a predetermined condition is satisfied, the first pixel and the second pixel being included in a plurality of pixels of a sensor;

setting the second pixel to a target of the predetermined correction processing in a case where an estimation value based on an output of the second pixel specified by the second information satisfies the predetermined condition; and correcting, through the predetermined correction processing, a value of the first pixel in an image acquired by the sensor and a value of the second pixel set to be a target of the predetermined correction processing in the image acquired by the sensor, wherein each pixel of the sensor includes an avalanche photodiode; and wherein the method further comprises acquiring an estimation value for the change in the value of the second pixel with the use of the sensor based on the number of times an avalanche phenomenon occurs in the avalanche photodiode of the sensor.

11. The non-transitory computer-readable storage medium according to claim 10, further comprising correcting, through the predetermined correction processing, a value of a pixel specified by the first information in the image acquired by the sensor and a value of a pixel set to a target of the predetermined correction processing based on the second information in the image acquired by the sensor.

12. The non-transitory computer-readable storage medium according to claim 10, wherein the first pixel outputs a value greater than or equal to a first threshold even in a state without incident light, wherein the second pixel has a characteristic of outputting a value greater than or equal to a second threshold value lower than the first threshold even in the state without incident light, and wherein the predetermined condition is that the estimation value for the second pixel in the state without incident light is greater than or equal to the first threshold.

* * * * *